(12) United States Patent
Dang et al.

(10) Patent No.: US 6,694,630 B2
(45) Date of Patent: Feb. 24, 2004

(54) MULTIPLE-AXIS LASER EMITTER WITH OPTICAL BEAM SPLITTER

(75) Inventors: Lieu-Kim Dang, Schaan (DE); Erwin Bünter, Eichberg (CH); Karsten Brandenburg, Feldkirch-Tosters (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/115,172

(22) Filed: Apr. 3, 2002

(65) Prior Publication Data

US 2002/0144415 A1 Oct. 10, 2002

(30) Foreign Application Priority Data

Apr. 4, 2001 (DE) .......................................... 101 16 563

(51) Int. Cl.$^7$ .............................................. G01C 15/00
(52) U.S. Cl. ...................... 33/286; 33/DIG. 21; 33/290; 33/285; 33/281; 33/282; 33/283; 356/138; 356/149; 356/250; 356/636
(58) Field of Search ........................... 33/286, DIG. 21, 33/290, 285, 281, 282, 283, 291, 227, 228; 356/138, 149, 250, 636

(56) References Cited

U.S. PATENT DOCUMENTS

| 4,441,818 A | * | 4/1984 | Wickman ..................... 33/290 |
| 5,144,487 A | * | 9/1992 | Hersey .................. 33/DIG. 21 |
| 5,459,932 A | * | 10/1995 | Rando et al. .................. 33/291 |
| 5,500,524 A | * | 3/1996 | Rando .......................... 33/286 |
| 5,617,202 A | * | 4/1997 | Rando .......................... 33/286 |
| 6,292,303 B1 | * | 9/2001 | Hamar ......................... 33/286 |
| 6,427,347 B1 | * | 8/2002 | Butler, Sr. .................... 33/286 |
| 6,470,578 B1 | * | 10/2002 | Phuly et al. ................... 33/286 |

\* cited by examiner

*Primary Examiner*—Diego Gutierrez
*Assistant Examiner*—Amanda J. Hoolahan
(74) *Attorney, Agent, or Firm*—Sidley Austin Brown & Wood, LLP

(57) ABSTRACT

A multiple axis laser emitter (1) comprising an optical beam splitter (4) having at least two reflectively coated mirror surfaces (7a, 7b, 7c, 7d) oriented perpendicular to each other and each oriented at an angle of 45° to a collimated main beam (H) of a laser light source (6) and at an angle of 90° to each other, wherein, in the beam path, an optical wedge (8a, 8b, 8c, 8d, 8e) is arranged downstream to at least one of the component beams (Ta, Tb, Tc, Td) deflected by the mirror surfaces (7) at an angle of 90° to the main beam (H).

12 Claims, 3 Drawing Sheets

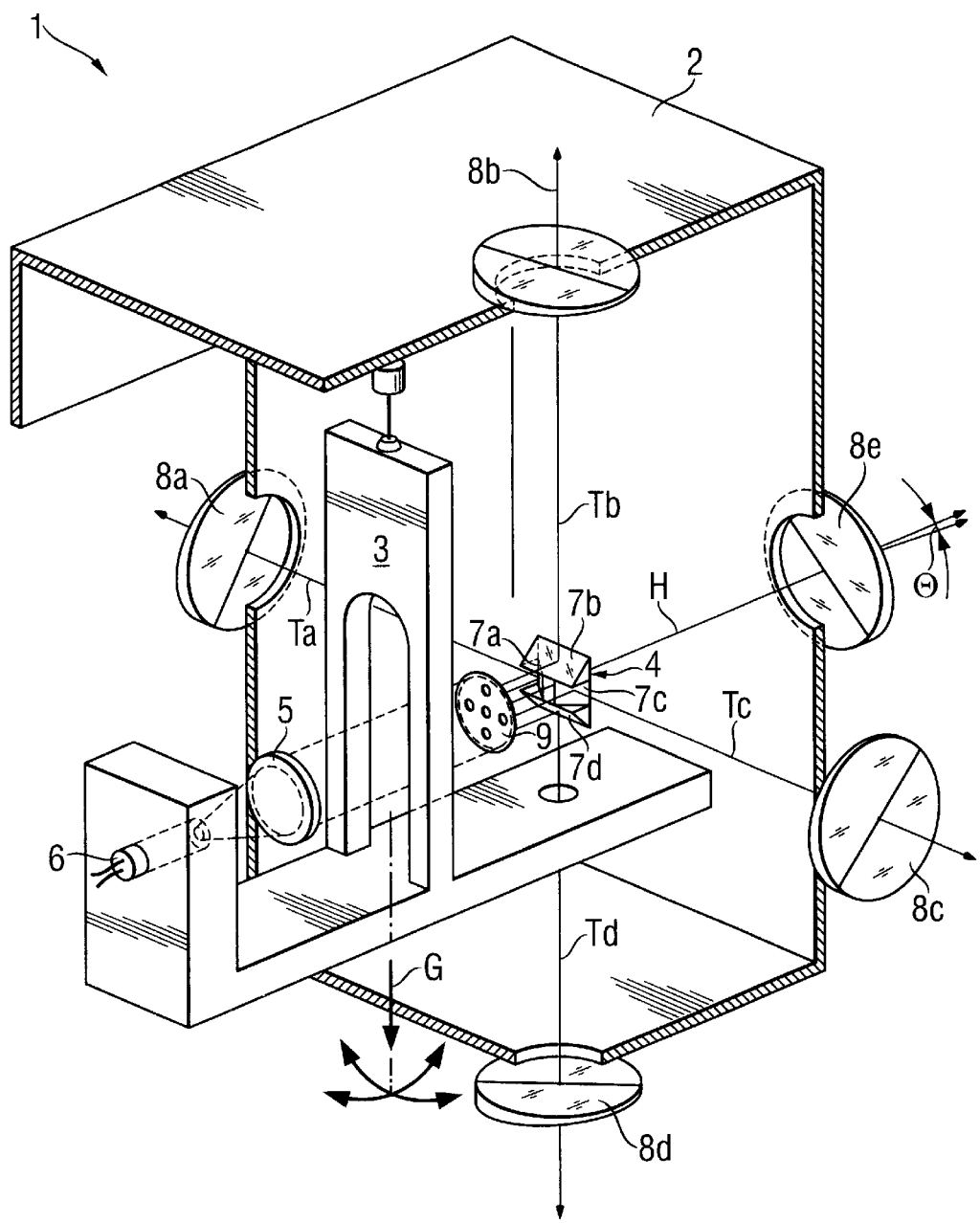

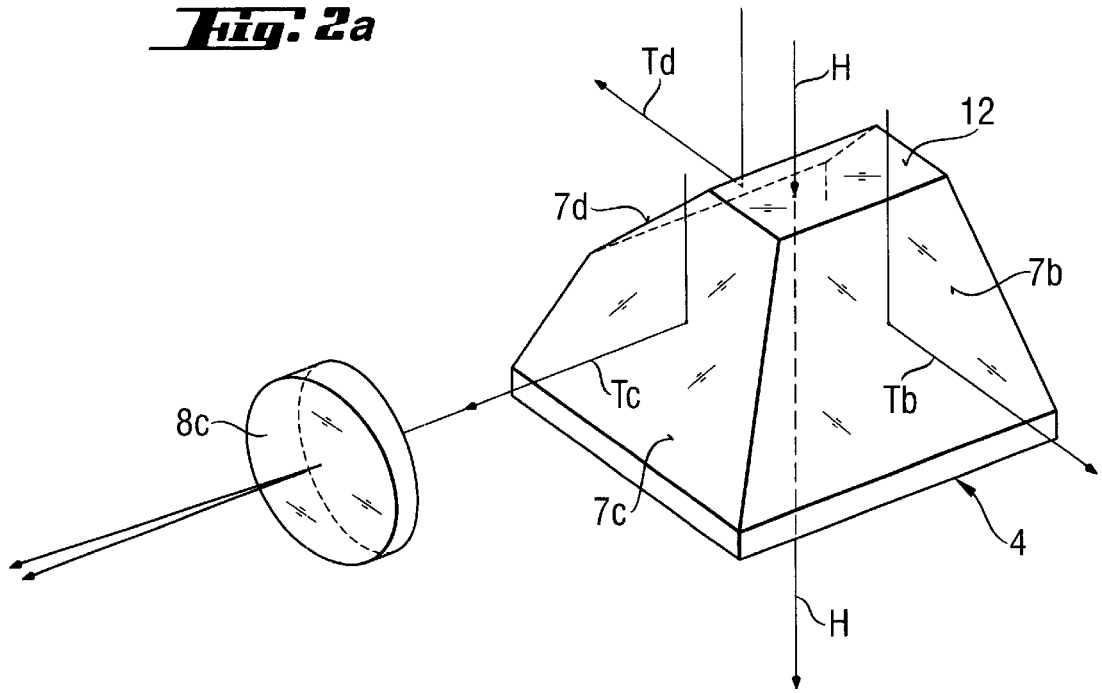

MULTIPLE-AXIS LASER EMITTER WITH OPTICAL BEAM SPLITTER

BACKGROUND OF THE INVENTION

The invention relates to a multiple axis laser emitter with an optical beam splitter, which emits in at least 3 directions perpendicular to each other and, preferably, is self-leveling with respect to gravity.

Such a multiple axis laser emitter with three to five visible laser emitters oriented along the axes of a Cartesian coordinate system is used, in particular, in the construction industry, for surveying and leveling. The beam splitter of the multiple axis laser emitter is conventionally suspended moveably in a housing and point-supported by gravity.

U.S. Pat. No. 5,617,202 discloses a beam splitter for a self-leveling multiple axis laser emitter, which visibly emits in 3 different directions, whereby the beam splitter comprises mirror surfaces masked by a collimator oriented 45° to the main beam, wherein the mirror surfaces are reflectively coated prism surfaces or single mirrors cemented together. A mildly curved lens for each component beam is arranged in the housing to compensate for a persistent leveling error, in the moveable housing of the point-support of the beam splitter, by the lateral displacement therethrough of the component beams relative to the housing. The cross-sectional elliptical laser beam is parallel to a component beam and polarized perpendicular to another component beam.

Further, EP 797071 discloses a self-leveling optical assembly with a laser light source and a prism, to which a pair of optical wedges are located upstream in the beam path, which provide angular correction and combined minimize an angular error at the time of leveling.

The object of the invention is to provide a highly precise multiple axis laser emitter with which a lower precision optical beam splitter can be used.

SUMMARY OF THE INVENTION

The object is achieved by the present invention. According to the invention, a multiple axis laser emitter comprises a beam splitter with at least two reflective coated mirror surfaces arranged perpendicular to each other and each oriented relevant to a collimated main beam of a laser light source at an angle of 45° and to each other at an angle of 90°, whereby an optical wedge is arranged downstream in the beam path of at least one component beam, said component beam is deflected by the mirror surfaces at an angle of 90° relative to the main beam.

With the use of a lower precision beam splitter, at least one component beam deviates, from the precise 90° deviation relative to the other component beams, even with an optimal arrangement of the beam splitter prism. At least one concrete optical wedge comprising a stepped set of different optical wedges can be selected at the time of manufacturing the beam splitter, for correction of the persisting residual angular error, said optical wedges being arranged behind the beam splitter for reducing the residual error below a permissible threshold value.

Preferably, the mirror surfaces are prisms coated with reflective metal or dielectric material and can be technologically simple, cast in glass or injected plastic in the assembled form.

Preferably, the beam splitter is pivotally adjustable about two axes transverse to the main beam, whereby by appropriate prior selection of the angular position, two component beams at an angle of 90° may be adjusted, and the error between two other component beams can be reduced.

Preferably, the mirror surfaces of the beam splitter are, at least partially, assembled, into a compact integral beam splitter and, preferably, by cementing, whereby the individual component beam splitters, for example, in the form of four 45° prisms, are technologically simpler to manufacture. The angular errors between the component beams due to the lesser precision of the beam splitter that must be accepted is compensated for, to higher precision, by the solution offered by this invention.

Preferably, the optical wedge is fixed relative to the beam splitter, whereby the beam splitter and the associated splitter plate form a compact, precision module for beam splitting.

Alternatively, preferably, in a beam splitter moveably mounted in a housing using a point support system and deflected, vibration-damped and self-leveling by gravity, the optical wedge is located in the point-supported housing in the exit zone of the component beam, whereby the moveably mounted module is more compactly produced and a lateral displacement of the housing does not generate additional angular deviation.

Preferably, the diaphragm arranged between the collimator and the beam splitter or mounted on the beam splitter, essentially shading the beam splitter, has diaphragm openings for each component beam, wherein preferably the plate-like diaphragm opening for an individual component beam is smaller than one quarter of the rest of the plate-like diaphragm opening. As a result, the individual, i.e., downwardly oriented, weak component beam is still sufficiently intense and, for geometric reasons, a larger remaining plate-like diaphragm opening can be obtained than with all diaphragm openings of equal area, and, thus, more intensive residual, i.e., laterally and upwardly oriented, component beams are emitted.

Preferably, the diaphragm opening for the individual component beam H is square to take better advantage of the available area, on the one hand, and to produce a cross-hair diffraction pattern on the far field as an aid to orientation, on the other hand. Preferably, the rest of the diaphragm openings are round or square and arranged close enough to the prism edges and to the square diaphragm opening to achieve a sharp delineation of the diffraction pattern on the far field.

Preferably, in the plane of polarization, a laser light source is polarized at an angle of 45° to the respective component beams and deflected to each other by an angle of 90° relative to the main beam, whereby, with the reflection at the mirror surfaces, the components of the main beam, oriented both vertically and parallel to the plane of incidence, are reflected at the same degree of reflection with respect to all mirror surfaces of the beam splitter.

The beam splitter is preferably designed as a truncated pyramid and exhibits at least three, reflectively coated mirror surfaces inclined at 45° and oriented perpendicular to each other relative to a transparent cover surface. Preferably, the truncated pyramid shaped beam splitter, with respect to its axis of symmetry, is laterally displaced relative to the main beam, whereby one lateral edge is arranged parallel to the plane of polarization of the main beam.

A beam splitter for a laser light source such as a semiconductor laser diode with strongly elliptical beam cross-section of the main beam preferably comprises a beam splitter prism with two component prisms, wherein a first prismatic component prism has two reflectively coated mirror surfaces oriented perpendicular to each other and a transparent cover surface connected to the surfaces at an angle of 45°, and the second prismatic component prism has a reflectively coated mirror surface oriented at an angle of 45° relative to a lateral surface. The first component prism is bonded by its lateral surface to the second component prism at its lateral surface in such a fashion, further preferably cemented, that the mirror surface of the second component prism, in its half with respect to its thickness offset laterally to the plane of symmetry of the first component prism, lying flush on the cover surface and oriented at 45° to same.

BRIEF DESCRIPTION OF THE DRAWINGS

The invention is more completely explained with reference to a preferable embodiment read together with:

FIG. 1 illustrating a multiple axis laser emitter with an optical beam splitter, in accordance with the invention;

FIG. 2a and 2b illustrating a beam splitting prism in a round beam cross-section of the main beam, in accordance with the invention;

DETAILED DESCRIPTION OF THE INVENTION

Figure 3A:
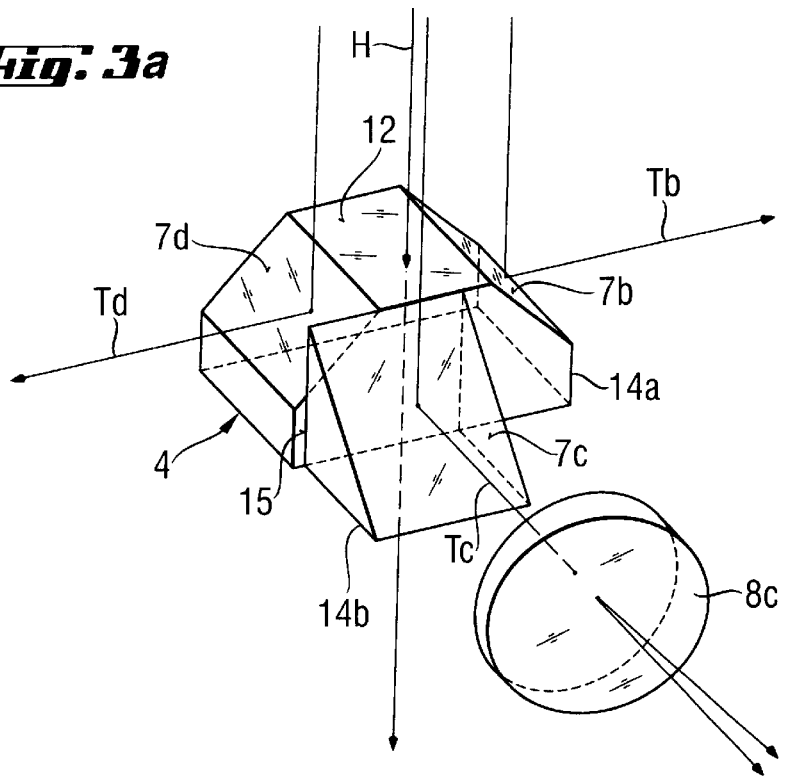
FIG. 3a and 3b illustrating a beam splitting prism in an elliptical beam cross-section of the main beam, in accordance with the invention.

According to FIG. 1, a multiple axis laser emitter 1 includes, in its housing 2, a pivotally adjustable beam splitter 4 mounted suspended on a pointed-support and a gravitationally deflected pendulum 3 swiveling about two axes. A main beam H of a laser light source 6 collimated by a collimator 5 is imprecisely deflected at an angle of 90° at reflectively coated mirror surfaces 7a, 7b, 7c, 7d (of which only 7b is represented) of the beam splitter 4. In the beam path of the 90° deflected component beams Ta, Tb, Tc, Td and the main beam H, an optical wedge 8a, 8a, 8c, 8d is arranged downstream of each and, which provides correction of a persisting residual angular error θ, and is mounted in the exit zone of the housing 2. A diaphragm 9 arranged upstream of the beam splitter disengages the beam splitter 4 and divides the main beam H into individual regions, assigned to the individual mirror surfaces 7, for the component beams Ta, Tb, Tc, Td. The beam splitter 4 is comprised of four individual 45° prisms that are cemented together to form a compact unit. The prisms are arranged around an optically unoccupied axis of symmetry along the main beams H and perpendicular to each other.

According to FIG. 2a and 2b, for one main beam H with a round beam cross-section 10, the diaphragm 9 is assigned to the one-piece truncated pyramidal beam splitter 4 with three reflectively coated mirror surfaces 7b, 7c, 7d arranged at 45° to the main beam H. The diaphragm has four separate diaphragm openings 11b, 11c, 11d, 11e for each of the three component beams Tb, Tc, Td and the main beam H passes through the transparent cover surface 12, whereby the plate-like diaphragm opening 11d for one single component beam Td is smaller than a quarter of the remaining three plate-like diaphragm openings 11b, 11c, 11d. The diaphragm opening 11e for the main beam H is square. The diaphragm openings 11b, 11c, 11d are round for the component beams Tb, Tc or square for the component beam Td and arranged as closely as possible to the prism edges and the square diaphragm opening 11e. The plane of polarization 13 is polarized at the angle of 45° relative to the deflected component beams Tb, Tc, Td. The component beam Tc deflected by the mirror surface 7c is corrected by the optical wedge 8c fixed with the beam splitter 4.

Figure 3B:
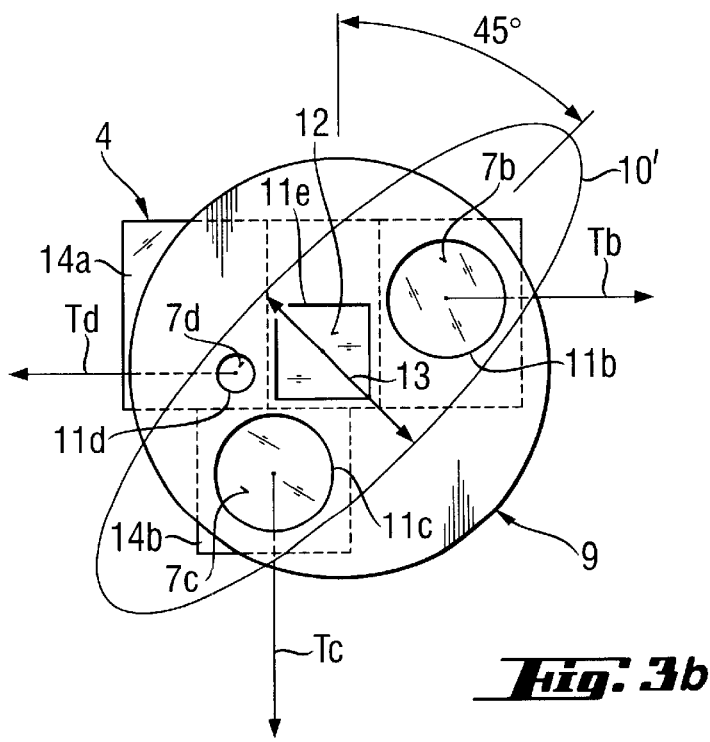

According to FIG. 3 and FIG. 3b, the diaphragm 9, for a main beam H, with a strong elliptical beam cross-section 10' and a plane of polarization 13 at a 45° angle to the deflected component beam, includes a flat arrangement of the individual diaphragm openings 11b, 11c, 11d, 11e, wherein the plate-like diaphragm opening 11d is smaller than the other diaphragm openings and the diaphragm opening 11e for the main beam H is square. The beam splitter 4 is assembled and cemented from two component prisms 14a, 14b, whereby the first prismatic component prism 14a has two reflective coated mirror surfaces 7b, 7d arranged perpendicular to each other and a transparent cover surface 12 joining these mirror surfaces 7b, 7d at an angle of 45°. The second prismatic component prism 14b has a reflective coated mirror surface 7c oriented at 45° relative to a lateral surface 15. The first component prism 14a is cemented at a lateral surface to the second component prism 14b, wherein the mirror surface 7c of the second component prism 14b is offset, in its half with respect to its thickness, laterally to the plane of symmetry of the first component prism 14a, lying flush at the cover surface 12 of the first component prism 14a and oriented at an angle of 45° to same. The component beam Tc deflected by the mirror surface 7c is corrected by the optical wedge 8c fixed relative to the beam splitter 4.

What is claimed is:

1. A multiple axis laser emitter comprising an optical beam splitter (4) with at least two reflective coated mirror surfaces (7a, 7b, 7c, 7d) arranged perpendicular to each other, each of the at least two reflective coated mirror surfaces (7a, 7b, 7c, 7d) oriented at an angle of 45° with respect to a collimated main beam (H) of a laser light source (6) and at an angle of 90° relative to each other, wherein in a beam path an optical wedge (8a, 8a, 8c, 8d) is arranged downstream to at least one of the component beams (Ta, Tb, Tc, Td) deflected by the mirror surfaces (7) at an angle of 90° to the main beam (H).

2. The multiple axis laser emitter of claim 1, wherein the mirror surfaces (7a, 7b, 7c, 7d) are reflective coated prism surfaces (14a, 14b).

3. The multiple axis laser emitter of claim 1, wherein the mirror surfaces (7a, 7b, 7c, 7d) of the beam splitter (4) are at least partially assembled to a compact whole.

4. The multiple axis laser emitter of claim 1, wherein the optical wedge (8a, 8a, 8c, 8d, 8e) is fixed relative to the beam splitter (4).

5. The multiple axis laser emitter of claim 1, wherein a self-leveling beam splitter (4) includes at least one optical wedge (8a, 8a, 8c, 8d, 8e) located in an exit zone of one of the component beams (Ta, Tb, Tc, Td) and the main beam (H) through a moveable, point-supported housing (2).

6. The multiple axis laser of claim 1, wherein a diaphragm (9) with separate diaphragm openings (11a, 11b, 11c, 11d, 11e) for each component beam (Ta, Tb, Tc, Td) and the main beam (H) is formed between a collimator (5) and the beam splitter (4).

7. The multiple axis laser emitter of claim 1, wherein the plane of polarization (13) of the laser light source (6) is polarized at a angle of 45° to the component beams (Ta, Tb, Tc, Td) and the component beams (Ta, Tb, Tc, Td) are deflected at an angle of 90° to each other relative to the main beam (H).

8. The multiple axis laser emitter of claim 1, wherein the beam splitter (4) is a truncated pyramid having at least three reflective mirror surfaces (7b, 7c, 7d) inclined at an angle of 45°, and each of the mirror surfaces (7b, 7c, 7d) is oriented perpendicular to each other relative to a transparent cover surface (12).

9. The multiple axis laser emitter of claim 8, wherein each of the mirror surfaces (7b, 7c, 7d) is offset laterally to the main beam (H) with respect to its plane of symmetry.

10. The multiple axis laser emitter of claim 1, wherein a beam splitter (4) for a laser light source (6) with a strongly elliptical beam cross-section (10') of the main beam (H) comprises a whole with two component prisms (14a, 14b) assembled together, wherein a first prismatic component prism (14a) has two reflective mirror surfaces (7b, 7d) that are perpendicular to each other and a transparent top surface connecting the two reflective mirror surfaces (7b, 7d) at an angle of 45°, and a second prismatic component prism (14b) has a reflective mirror surface (7c) oriented at an angle of 45° to a lateral surface (15), and both the first and second prismatic component prisms (14a,14b) are connected via the lateral surface (15).

11. The multiple axis laser emitter of claim 10, wherein the mirror surface (7c) of the second prismatic component prism (14b) is laterally offset from the plane of symmetry of the first prismatic component prism (14a) and lies flush at the cover surface (12) of the first prismatic component prism (14a) and oriented at an angle of 45° to the first prismatic component prism (14a).

12. The multiple axis laser emitter of claim 1, wherein the mirror surfaces (7a, 7b, 7c, 7d) of the beam splitter (4) are at least partially assembled to a compact whole by cementing, which is pivotally adjustable about two axes transverse to the main beam (H).

* * * * *